(12) United States Patent
Barrow et al.

(10) Patent No.: US 12,676,085 B2
(45) Date of Patent: Jul. 7, 2026

(54) ELASTOMERIC CARD CASE HOLDER DEVICE AND METHOD

(71) Applicant: Prestige World Wide Incubator LLC, Columbus, OH (US)

(72) Inventors: Andrew Barrow, Hilliard, OH (US); Luke Buchy, Westerville, OH (US); Jonathan Bouldin, Columbus, OH (US); Evan Cutler, Cornelius, NC (US); Mark Buchy, Westerville, OH (US)

(73) Assignee: Prestige World Wide Incubator LLC, Columbus, OH (US)

( * ) Notice: Subject to any disclaimer, the term of this patent is extended or adjusted under 35 U.S.C. 154(b) by 525 days.

(21) Appl. No.: 18/136,725

(22) Filed: Apr. 19, 2023

(65) Prior Publication Data

US 2023/0335017 A1     Oct. 19, 2023

Related U.S. Application Data

(60) Provisional application No. 63/332,448, filed on Apr. 19, 2022.

(51) Int. Cl.
*G09F 1/10*        (2006.01)
*H02N 15/00*       (2006.01)
(52) U.S. Cl.
CPC .............. *G09F 1/10* (2013.01); *H02N 15/00* (2013.01)
(58) Field of Classification Search
CPC ........ G09F 1/10; A47F 7/0021; A47F 7/0042; A47F 7/14

USPC ..... 248/127, 146, 154, 309.4, 311.2, 346.01, 248/346.03, 314
See application file for complete search history.

(56) References Cited

U.S. PATENT DOCUMENTS

| | | | | | |
|---|---|---|---|---|---|
| 2,956,687 | A | * | 10/1960 | Robichaud ......... | B65D 81/1075 |
| | | | | | 206/217 |
| 3,363,390 | A | * | 1/1968 | Crane ...................... | E06B 3/22 |
| | | | | | 52/800.14 |
| 5,055,061 | A | * | 10/1991 | Lichtenwalter .... | H01R 12/7005 |
| | | | | | 361/802 |
| 5,738,228 | A | * | 4/1998 | Bittinger ............... | A47F 7/0021 |
| | | | | | 211/60.1 |

(Continued)

FOREIGN PATENT DOCUMENTS

WO      WO-2007014766 A1 *  2/2007   ............... G09F 1/14

*Primary Examiner* — Cassandra Davis
(74) *Attorney, Agent, or Firm* — McDonnell Boehnen Hulbert & Berghoff LLP

(57)        ABSTRACT

The present disclosure relates to systems and methods that involve a plastic housing having a lower portion and an upper portion. The lower portion is configured to house a magnet that is adapted for placement above an electromagnetic assembly for levitation. The upper portion extends at least partially above the lower portion and further includes a slot. An elastomeric structure is disposed along an interior perimeter of the slot and includes a first plurality of ribs and a second plurality of ribs. Each rib includes a flexible portion and a retention portion. The flexible portion of the first plurality of ribs and the flexible portion of the second plurality of ribs receive an encasement and align the encasement in the slot. The retention portion of the first plurality of ribs and the retention portion of the second plurality of ribs secure the encasement within the slot.

12 Claims, 17 Drawing Sheets

(56)  References Cited

U.S. PATENT DOCUMENTS

| | | | | |
|---|---|---|---|---|
| 5,947,276 | A * | 9/1999 | Hsu | B43M 99/006 |
| | | | | 206/214 |
| 11,810,481 | B2 * | 11/2023 | Gerace | G09F 3/06 |
| 12,378,985 | B1 * | 8/2025 | Layton | F16B 12/44 |
| 2008/0000124 | A1 * | 1/2008 | Hecht | G09F 19/22 |
| | | | | 40/649 |
| 2011/0214321 | A1 * | 9/2011 | White | G09F 15/00 |
| | | | | 40/606.01 |
| 2024/0188942 | A1 * | 6/2024 | Johnson | A61B 10/0051 |

* cited by examiner

10

10

13    26b

26a

14

70

72

76     78

74

92 — Forming a plastic housing having a lower portion and an upper portion

94 — Inserting a magnet into the lower portion that is adapted for placement above an electromagnetic assembly for levitation 96 — Forming an elastomeric structure along an interior perimeter of a slot in the upper portion

ELASTOMERIC CARD CASE HOLDER DEVICE AND METHOD

CROSS-REFERENCE TO RELATED APPLICATIONS

The present application claims priority to provisional U.S. Application No. 63/332,448 filed Apr. 19, 2022, the content of which is hereby incorporated by reference in its entirety.

BACKGROUND

Collectors may display graded cards for a variety of reasons, such as to sell them or for decoration. Traditional displays range from wall mounts to shadow boxes to cases that are able to be stored flat. Some displays are configured to hold just one graded card, but some are configured to hold many cards at the same time.

However, it would be appreciated to have a manner of displaying a graded card such that both a front of the card and a back of the card were visible for observation in the display. It would also be beneficial to display a graded card in a unique and interesting way.

SUMMARY

The present disclosure generally relates to elastomeric card case holder within an electromagnetic levitating system for display of encased collectible cards. The elastomeric card case holder utilizes the electromagnetic system as a foundation to magnetically levitate, hold and display a collectable card in a graded card case. The present disclosure provides for a secured and stable way to display encased collectible cards in a 360° rotating and levitating electromagnetic system.

In a first aspect, a system is disclosed that includes a plastic housing having a lower portion and an upper portion such that the lower portion is configured to house a magnet that is adapted for placement above an electromagnetic assembly for levitation. The upper portion extends at least partially above the lower portion, the upper portion further includes a slot. That system also includes an elastomeric structure that is disposed along an interior perimeter of the slot such that the elastomeric structure includes a first plurality of ribs and a second plurality of ribs. Each rib of the first plurality of ribs and each rib of the second plurality of ribs includes a flexible portion and a retention portion such that the flexible portion of each rib of the first plurality of ribs is arranged along a first direction and the flexible portion of each rib of the second plurality of ribs is arranged along a second direction. The flexible portion of the first plurality of ribs and the flexible portion of the second plurality of ribs are configured to receive an encasement and align the encasement in the slot. The retention portion of the first plurality of ribs and the retention portion of the second plurality of ribs are configured to secure the encasement within the slot.

In a second aspect, a method includes inserting an encasement into a slot of a display assembly. The display assembly includes a plastic housing having a lower portion and an upper portion such that the lower portion is configured to house a magnet that is adapted for placement above an electromagnetic assembly for levitation. The upper portion extends at least partially above the lower portion, the upper portion further including the slot configured to receive the encasement. The display assembly also includes an elastomeric structure that is disposed along an interior perimeter of the slot such that the elastomeric structure includes a first plurality of ribs and a second plurality of ribs. Each rib of the first plurality of ribs and each rib of the second plurality of ribs includes a flexible portion and a retention portion such that the flexible portion of each rib of the first plurality of ribs is arranged along a first direction and the flexible portion of each rib of the second plurality of ribs is arranged along a second direction. The flexible portion of the first plurality of ribs and the flexible portion of the second plurality of ribs are configured to receive the encasement and align the encasement in the slot. The retention portion of the first plurality of ribs and the retention portion of the second plurality of ribs are configured to secure the encasement within the slot.

In a third aspect, a method of manufacturing includes forming a plastic housing having a lower portion and an upper portion such that the upper portion extends at least partially above the lower portion, inserting a magnet into the lower portion that is adapted for placement above an electromagnetic assembly for levitation, and forming an elastomeric structure along an interior perimeter of a slot in the upper portion. The elastomeric structure includes a first plurality of ribs and a second plurality of ribs. Each rib of the first plurality of ribs and each rib of the second plurality of ribs includes a flexible portion and a retention portion such that the flexible portion of each rib of the first plurality of ribs is arranged along a first direction and the flexible portion of each rib of the second plurality of ribs angles is arranged along a second direction. The flexible portion of the first plurality of ribs and the flexible portion of the second plurality of ribs are configured to receive an encasement and align the encasement in the slot. The retention portion of the first plurality of ribs and the retention portion of the second plurality of ribs are configured to secure the encasement within the slot.

Other aspects, embodiments, and implementations will become apparent to those of ordinary skill in the art by reading the following detailed description, with reference where appropriate to the accompanying drawings.

DETAILED DESCRIPTION

Figure 1:
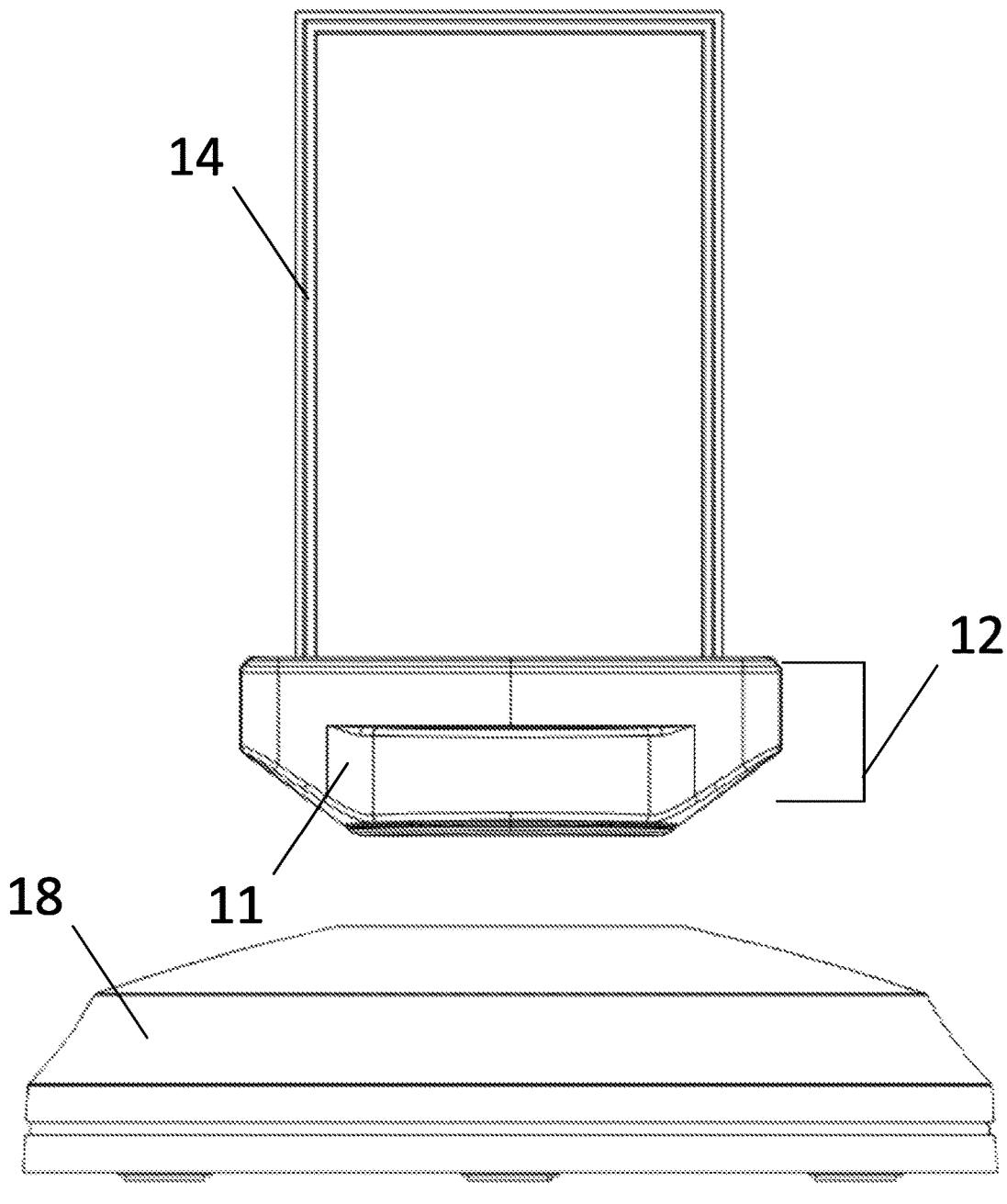
FIG. 1 shows an electromagnetic levitating display system, according to an example embodiment.
Figure 2:
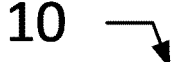
FIG. 2 shows an isometric view of an electromagnetic levitating display system, according to an example embodiment.
Figure 3:
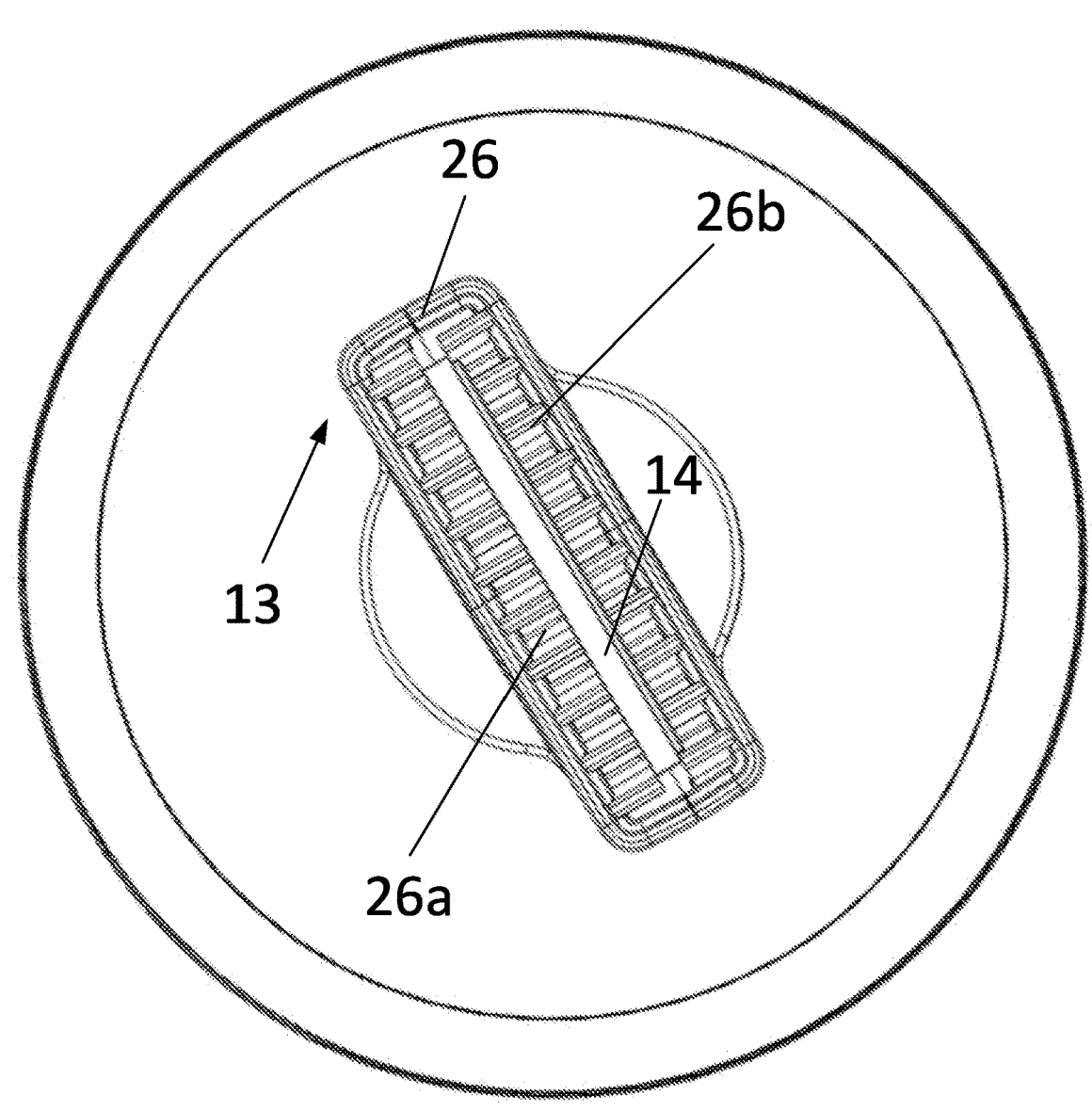
FIG. 3 shows a top view of an elastomeric card case holder, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure provides for the secured levitation of encased trading cards or other objects using an electromagnetic system. A system is disclosed that includes a plastic housing having a lower portion and an upper portion such that the lower portion is configured to house a magnet that is adapted for placement above an electromagnetic assembly for levitation and the upper portion extends at least partially above the lower portion, the upper portion further includes a slot. An elastomeric structure is disposed along an interior perimeter of the slot such that the elastomeric structure includes a first plurality of ribs and a second plurality of ribs. Each rib of the first plurality of ribs and each rib of the second plurality of ribs includes a flexible portion and a retention portion such that the flexible portion of each rib of the first plurality of ribs is arranged along a first direction and the flexible portion of each rib of the second plurality of ribs is arranged along a second direction. The flexible portion of the first plurality of ribs and the flexible portion of the second plurality of ribs are configured to receive an encasement and align the encasement in the slot. The retention portion of the first plurality of ribs and the retention portion of the second plurality of ribs are configured to secure the encasement within the slot. Furthermore, the elastomeric nature of the holder means that the same is free from ferrous metallic hardware avoiding any electrical interference with the electromagnetic system.

In some embodiments, the first plurality of ribs are along a first half of the elastomeric structure and the second plurality of ribs are along a second half of the elastomeric structure. Further, in some embodiments, the first half of the elastomeric structure is disposed along a first interior wall of the slot and the second half of the elastomeric structure is disposed along a second interior wall of the slot opposite the first interior wall of the slot. As such, in some embodiments, the first half of the elastomeric structure further comprises a first horizontal portion attaching together at least two ribs of the first plurality of ribs and the second half of the elastomeric structure further comprises a second horizontal portion attaching together at least two ribs of the second plurality of ribs.

In some embodiments, the elastomeric structure has a Shore hardness range between 30 Shore A and 60 Shore A. In other embodiments, the elastomeric structure has a smaller Shore hardness, such as between 38 Shore A and 56 Shore A. It will be understood that other Shore hardness values and ranges are possible and contemplated.

In some embodiments, the elastomeric structure comprises a thermoplastic vulcanizate (TPV), such as fully cured ethylene propylene diene monomer (EPDM) rubber particles encapsulated in a polypropylene (PP) matrix. In other embodiments, the elastomeric structure may comprise a number of other engineered plastics (e.g., Acrylonitrile butadiene styrene (ABS), polypropylene (PP), polyamide (PA), etc.).

In some embodiments, the flexible portion of each rib in the first plurality of ribs is arranged between 120° and 150° with respect to a first side of the encasement and the flexible portion of each rib in the second plurality of ribs is arranged between 120° and 150° with respect to a second side of the encasement.

In some embodiments, the retention portion of each rib of the first plurality of ribs further comprises a first alignment slot configured to receive a protruding portion of the encasement and the retention portion of each rib of the second plurality of ribs further comprises a second alignment slot configured to receive the protruding portion of the encasement.

In some embodiments, each rib of the first plurality of ribs is spaced between 4 mm and 8 mm from an adjacent rib and each rib of the second plurality of ribs is spaced between 4 mm and 8 mm from an adjacent rib.

In some embodiments, the magnet has a pull strength of at least 500 grams.

In some embodiments, the encasement comprises a graded card within a card case having a width between 70 mm and 90 mm.

In some embodiments, the system also includes a bumper pad attached to an underside of the lower portion of the plastic housing such that the bumper pad is configured to absorb energy.

The present disclosure provides for a method of secured levitation of encased cards using an electromagnetic system. A method includes inserting an encasement into a slot of a display assembly. The display assembly includes a plastic housing having a lower portion and an upper portion such that the lower portion is configured to house a magnet that is adapted for placement above an electromagnetic assembly for levitation and the upper portion extends at least partially above the lower portion, the upper portion further including the slot configured to receive the encasement. An elastomeric structure is disposed along an interior perimeter of the slot such that the elastomeric structure includes a first plurality of ribs and a second plurality of ribs. Each rib of the first plurality of ribs and each rib of the second plurality of ribs includes a flexible portion and a retention portion such that the flexible portion of each rib of the first plurality of ribs is arranged along a first direction and the flexible portion of each rib of the second plurality of ribs is arranged along a second direction. The flexible portion of the first plurality of ribs and the flexible portion of the second plurality of ribs are configured to receive the encasement and align the encasement in the slot. The retention portion of the first plurality of ribs and the retention portion of the second plurality of ribs are configured to secure the encasement within the slot.

In some embodiments, the method further includes placing the display assembly above an electromagnetic assembly and levitating the display assembly above the electromagnetic assembly. In some embodiments, placing the display assembly above the electromagnetic assembly includes aligning the display assembly above the electromagnetic assembly using an alignment tool that is temporarily placed between the display assembly and the electromagnetic assembly and removing the alignment tool from between the display assembly and the electromagnetic assembly once the display assembly and the electromagnetic assembly have been aligned. Further, in some embodiments, the method includes rotating the display assembly 360° at a constant rotational rate. In some embodiments, the constant rotational rate is between 10 and 20 revolutions per minute.

The present disclosure provides for a method of manufacturing a secured levitation of encased cards using an electromagnetic system. A method of manufacturing includes forming a plastic housing having a lower portion and an upper portion such that the upper portion extends at least partially above the lower portion, inserting a magnet into the lower portion that is adapted for placement above an electromagnetic assembly for levitation, and forming an elastomeric structure along an interior perimeter of a slot in the upper portion. The elastomeric structure includes a first plurality of ribs and a second plurality of ribs. Each rib of the first plurality of ribs and each rib of the second plurality of ribs includes a flexible portion and a retention portion such that the flexible portion of each rib of the first plurality of ribs is arranged along a first direction and the flexible portion of each rib of the second plurality of ribs angles is arranged along a second direction. The flexible portion of the first plurality of ribs and the flexible portion of the second plurality of ribs are configured to receive an encasement and align the encasement in the slot. The retention portion of the first plurality of ribs and the retention portion of the second plurality of ribs are configured to secure the encasement within the slot.

In some embodiments, the elastomeric structure is chemically bonded to the interior perimeter of the slot in the upper portion.

In some embodiments, a first half of the elastomeric structure comprising the first plurality of ribs is formed separately from a second half of the elastomeric structure comprising the second plurality of ribs. Further, in some embodiments, the first half of the elastomeric structure is disposed along a first interior wall of the slot and the second half of the elastomeric structure is disposed along a second interior wall of the slot opposite the first interior wall of the slot.

II. Example Rotatable Mirror Assemblies

FIGS. 1-5C illustrate an electromagnetic levitating display system 10 that involves a plastic housing having a lower portion 11 and an upper portion 12 such that the lower portion 11 is configured to house a magnet that is adapted for placement above an electromagnetic assembly 18 for levitation and the upper portion 12 extends at least partially above the lower portion 11, the upper portion further including a slot 13. An elastomeric structure 26 is disposed along an interior perimeter of the slot 13 such that the elastomeric structure 26 includes a first plurality of ribs 26a and a second plurality of ribs 26b. In some embodiments, each rib of the first plurality of ribs 26a is spaced between 4 mm and 8 mm from a next rib of the first plurality of ribs 26a. Similarly, in some embodiments, each rib of the second plurality of ribs 26b is spaced between 4 mm and 8 mm from a next rib of the second plurality of ribs 26b.

Each rib of the first plurality of ribs 26a and each rib of the second plurality of ribs 26b includes a flexible portion 32 and a retention portion 34 such that the flexible portion 32 of each rib of the first plurality of ribs 26a is arranged along a first direction and the flexible portion 32 of each rib of the second plurality of ribs 26b is arranged along a second direction. The flexible portion 32 of the first plurality of ribs 26a and the flexible portion 32 of the second plurality of ribs 26b are configured to receive an encasement 14 and align the encasement 14 in the slot 13. The retention portion 34 of the first plurality of ribs 26a and the retention portion 34 of the second plurality of ribs 26b are configured to secure the encasement 14 within the slot 13.

Figure 4:
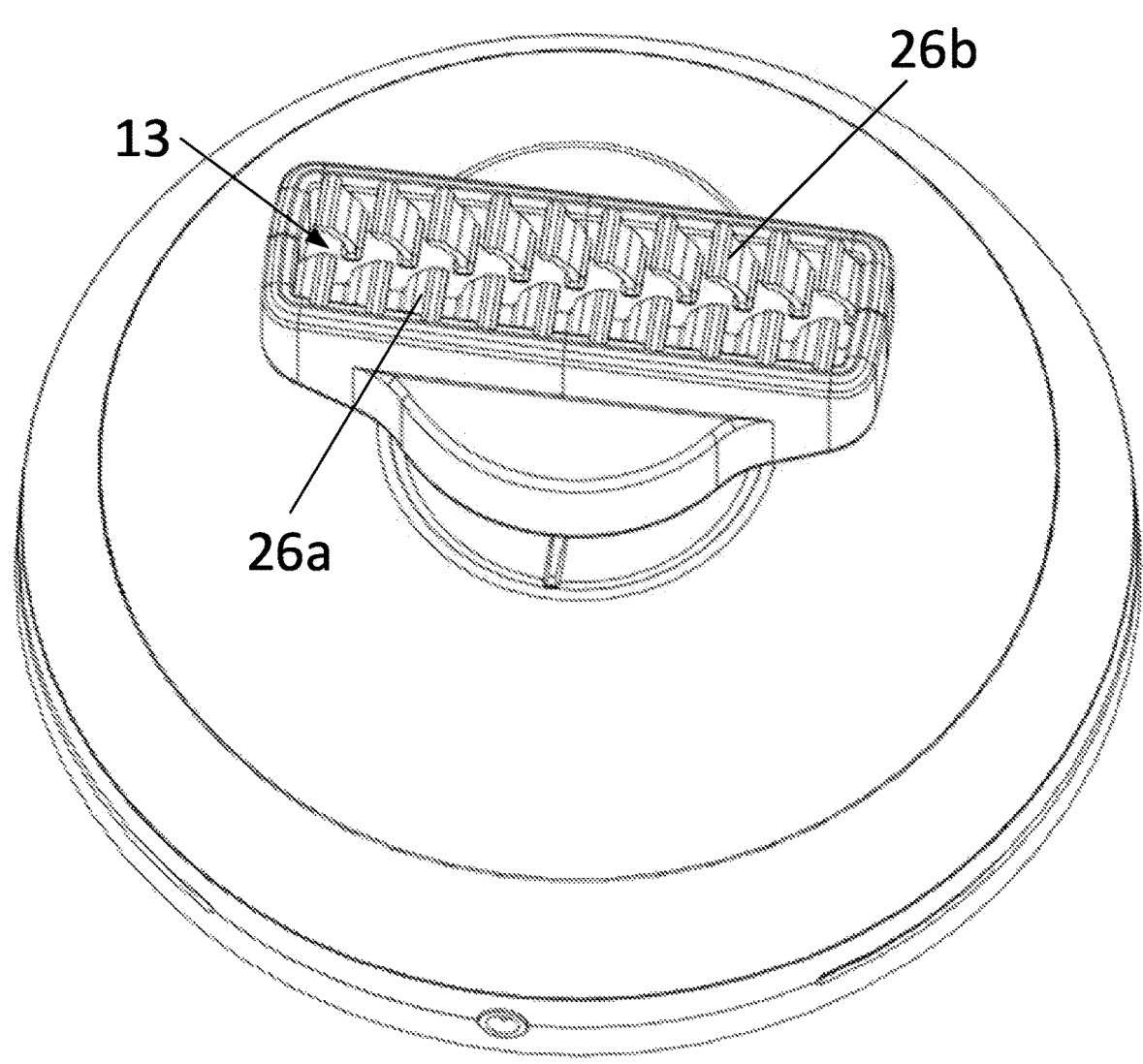
FIG. 4 shows an isometric view of an elastomeric card case holder, according to an example embodiment.

The flexible portion 32 of each rib angles between 120° and 150°. As shown in FIG. 4, in some embodiments, the flexible portion 32 of the first plurality of ribs 26a angles in a first direction that is opposite to the second direction of the flexible portion 32 of the second plurality of ribs 26b. Therefore, when an encasement 14 is placed inside the slot 13 between the first plurality of ribs 26a and the second plurality of ribs 26b, the flexible portion 32 of each rib folds downwardly following the direction of the angle of each flexible portion 32. The flexible portion 32 functions as a lead-in shape or reaction surface reducing installation force; thus, facilitating the placement of the encasement 14 in the slot 13. Moreover, the flexible portion 32 of the first plurality of ribs 26a angling in first direction that is opposite to the second direction of the flexible portion 32 of the second plurality of ribs 26b balances deflection between the right side and left side of the encasement 14 and therefore secures the installation of the encasement 14 in vertical position in the slot 13.

Figure 5A:
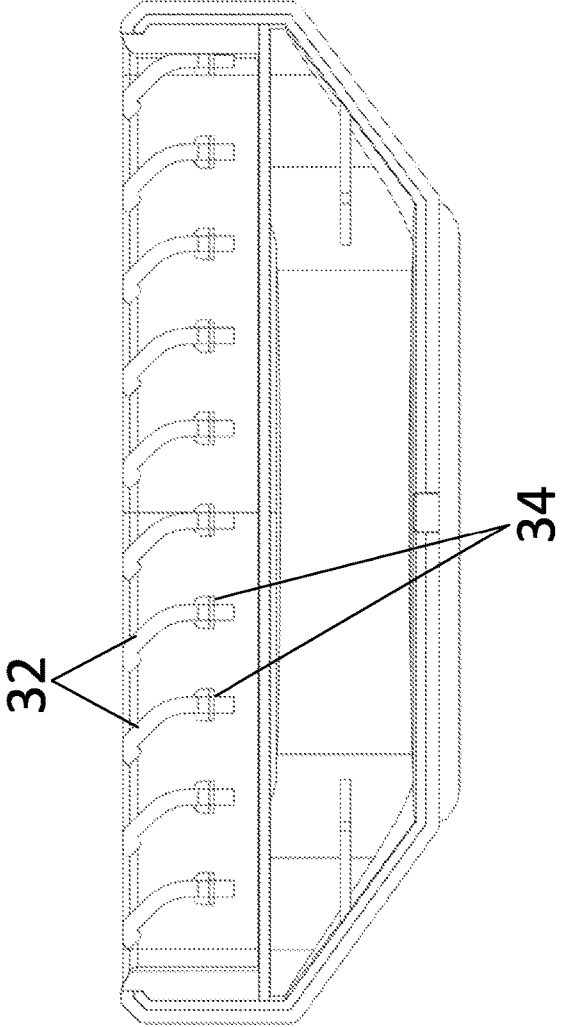
FIG. 5A shows a sectional view of an elastomeric card case holder, according to an example embodiment.
Figure 5B:
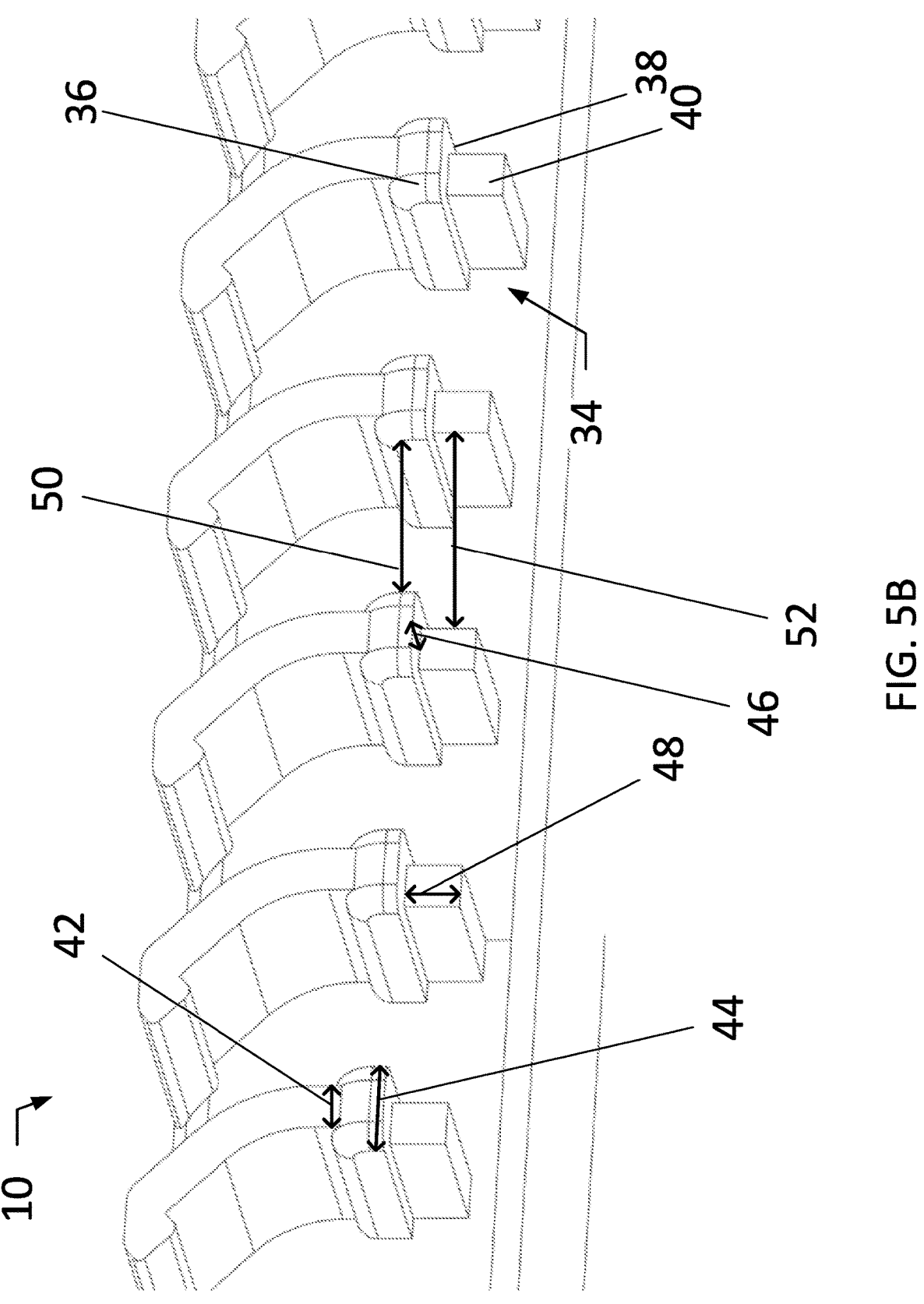
FIG. 5B shows a close-up sectional view of the elastomeric card case holder in FIG. 5A, according to an example embodiment.
Figure 5C:
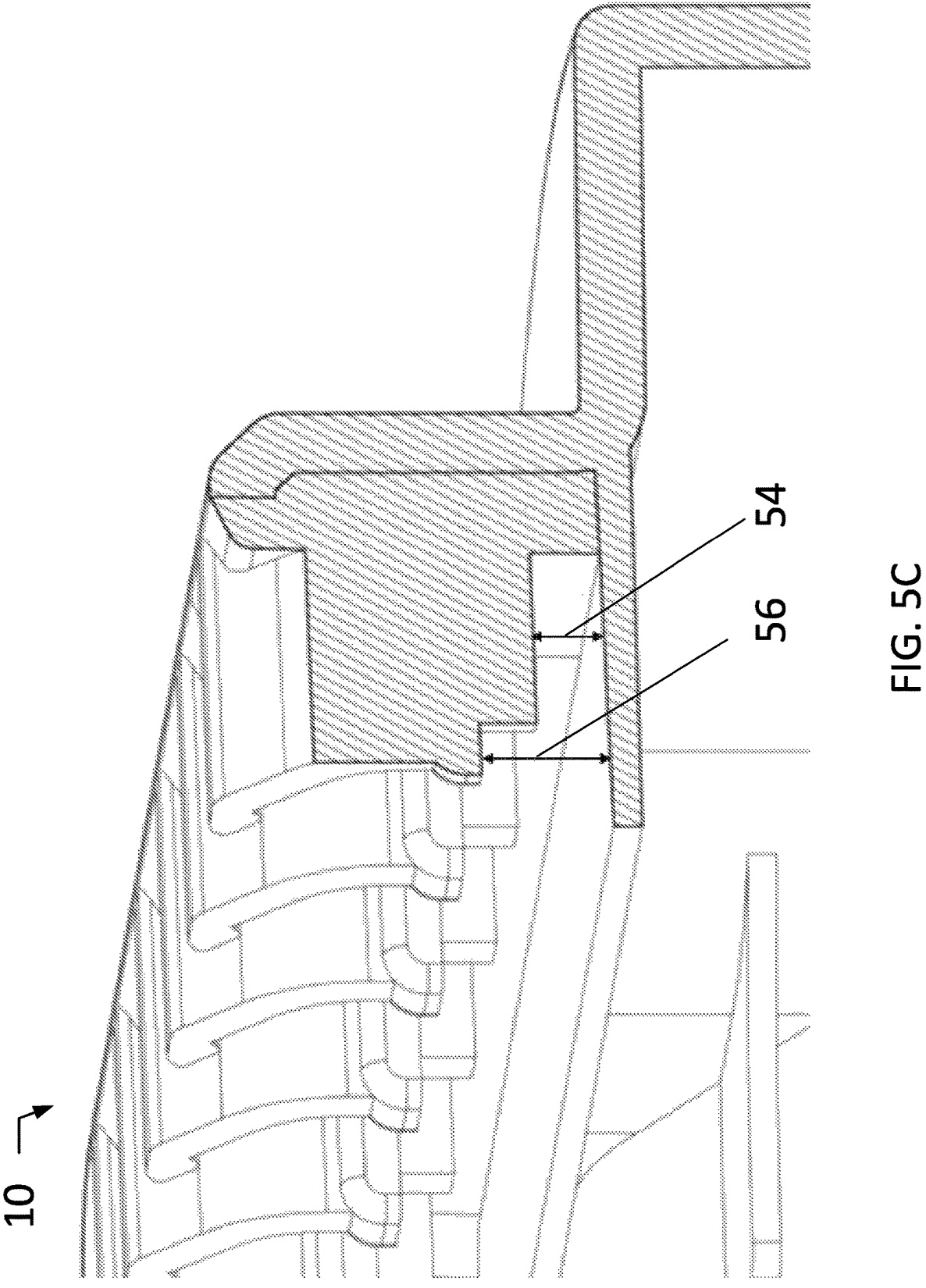
FIG. 5C shows a further sectioned sectional view of the elastomeric card case holder in FIG. 5A, according to an example embodiment.

As shown in FIGS. 5A-5C, the retention portion 34 of the first plurality of ribs 26a and the retention portion 34 of the second plurality of ribs 26b a lead-in structure 36, a lip 38, and a retaining wall 40. The lead in structure 36, the lip 38, and the retaining wall 40 on each rib of the first plurality of ribs 26a and the second plurality of ribs 26b are configured to receive the encasement 14 and provide further security for the encasement 14. In some embodiments, the lead-in structure 36 has a rounded top, like a mushroom cap, that enables the encasement 14 to glide past conveniently and easily. Once past the lead-in structure 36, the encasement 14 may be configured to fit into the space between the lip 38 and the retaining wall 40. The lip 38 may be configured to prevent the encasement 14 from undesirably loosening or being removed upward from the slot 13, and opposing retaining walls 40 on each side of the first plurality of ribs 26a and the second plurality of ribs 26b may be configured to prevent the encasement 14 from undesirably shifting between a first side of the slot 13 and a second side of the slot 13.

In some embodiments, as shown in FIG. 5B, a thickness 42 of the flexible portion 32 may be smaller than a thickness 44 of the lead-in structure 36 of the retention portion 34 of each rib. For instance, the thickness 42 of the flexible portion 34 may be between 1 mm-3 mm, e.g. 1.6 mm. However, the thickness 44 of the lead-in structure 36 of the retention portion 34 of each rib may be larger, e.g. 3.2 mm. In some embodiments, the lip 38 may have a length 46 between 1 mm-3 mm, e.g. 2 mm. In some embodiments, the retaining wall has a depth 48 that is dependent on a height of the slot 13, but for example, the depth 48 may be 2 mm. In some embodiments, the distance 50 between subsequent lead-in structures 36 of neighboring ribs may range from 3 mm-7 mm, e.g. 6 mm, while the distance 52 between subsequent retaining walls 40 of neighboring ribs may be larger, in the range of 4 mm-8 mm, e.g. 7.6 mm. Further, in some embodiments, neighboring ribs may be connected by a piece of material to add rigidity to the shape. In some embodiments, as shown in FIG. 5C, the retaining walls 40 of each rib may begin at a depth 54 that is closer to a bottom of slot 13 than a depth 56 of the lip 38 of each rib. For instance, in some embodiments, the depth 54 may be 2.5 mm from the bottom of the slot 13 while the depth 56 may be 4.5 mm from the bottom of the slot 13. Other ranges for all of these components are possible and contemplated.

FIGS. 6-11 demonstrate the ability of the system to accommodate various sized encasements 14 having a range of thicknesses. For example, different card grading companies use unique protective cases for the graded cards, each having a different thickness. The elastomeric nature of the currently claimed system provides for the installation of a variety of card cases of different width, depth and height, including containers relating to Professional Sports Authenticator (PSA), Beckett Grading Services (BGS), and Sports Card Guaranty (SCG), among others. In some embodiments, the slot 13 could provide for the installation of card cases ranging in width between 70 mm and 90 mm, between 73 mm and 86 mm, and/or between 80 mm and 83 mm. Moreover, the slot 13 provides for the placement of card cases ranging in depth between 1.0 mm and 15 mm, between 1.5 mm and 13.5 mm, between 6.2 mm and 8.8 mm, and between 8.0 mm and 8.8 mm, between 8.4 mm and 8.7 mm. Furthermore, the slot 13 provides for the installation of card cases ranging in height between 100 mm and 140 mm, between 101 mm and 138 mm, between 110 mm and 135 mm, and/or between 127 mm and 130 mm.

Figures 6, 7, 8:
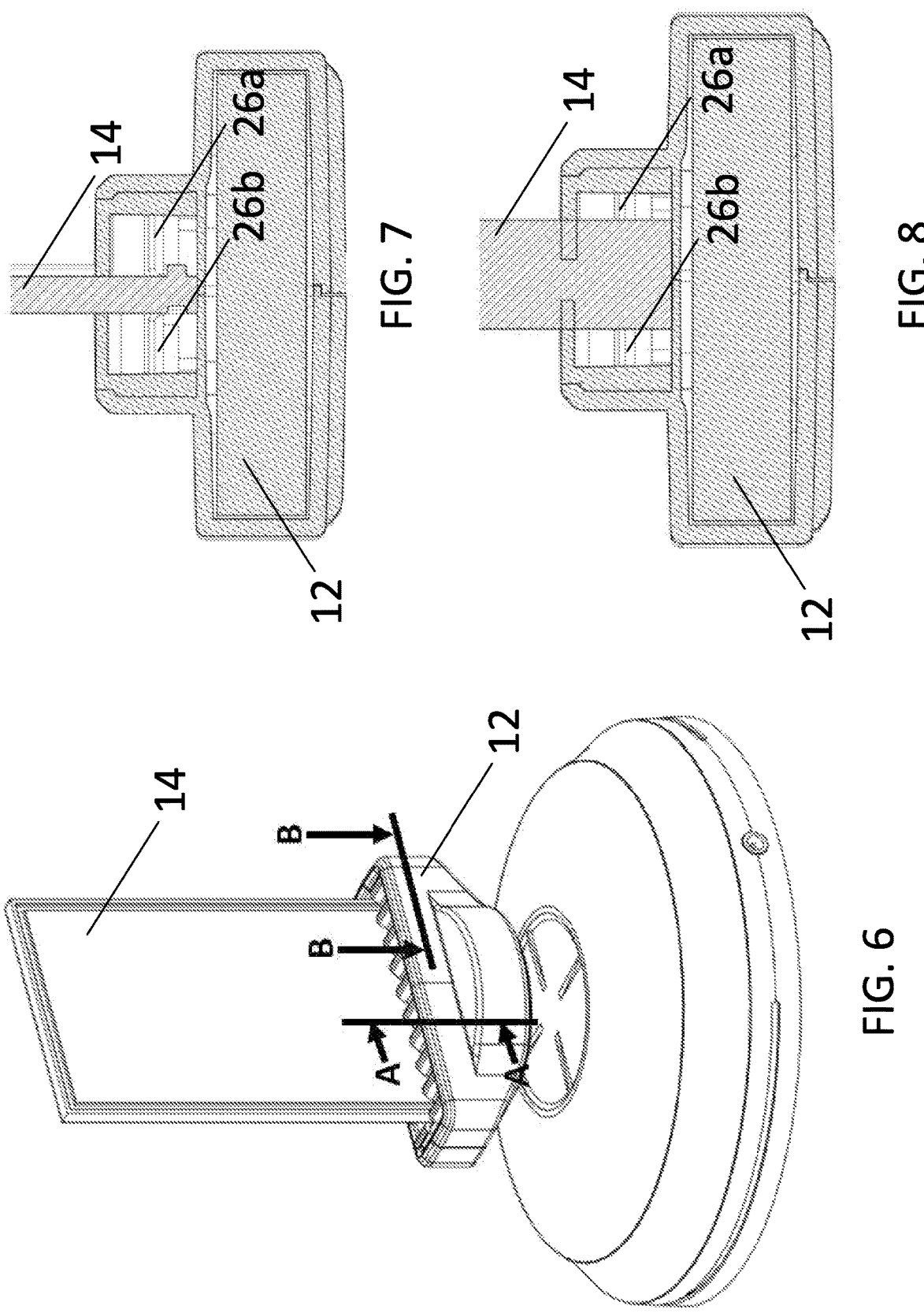
FIG. 6 shows an isometric view of an elastomeric card case holder with a card case, according to an example embodiment.
FIG. 7 shows a sectional view of an elastomeric card case holder with a card case, according to an example embodiment.
FIG. 8 shows a sectional view of an elastomeric card case holder with a card case, according to an example embodiment.
Figures 9, 10:
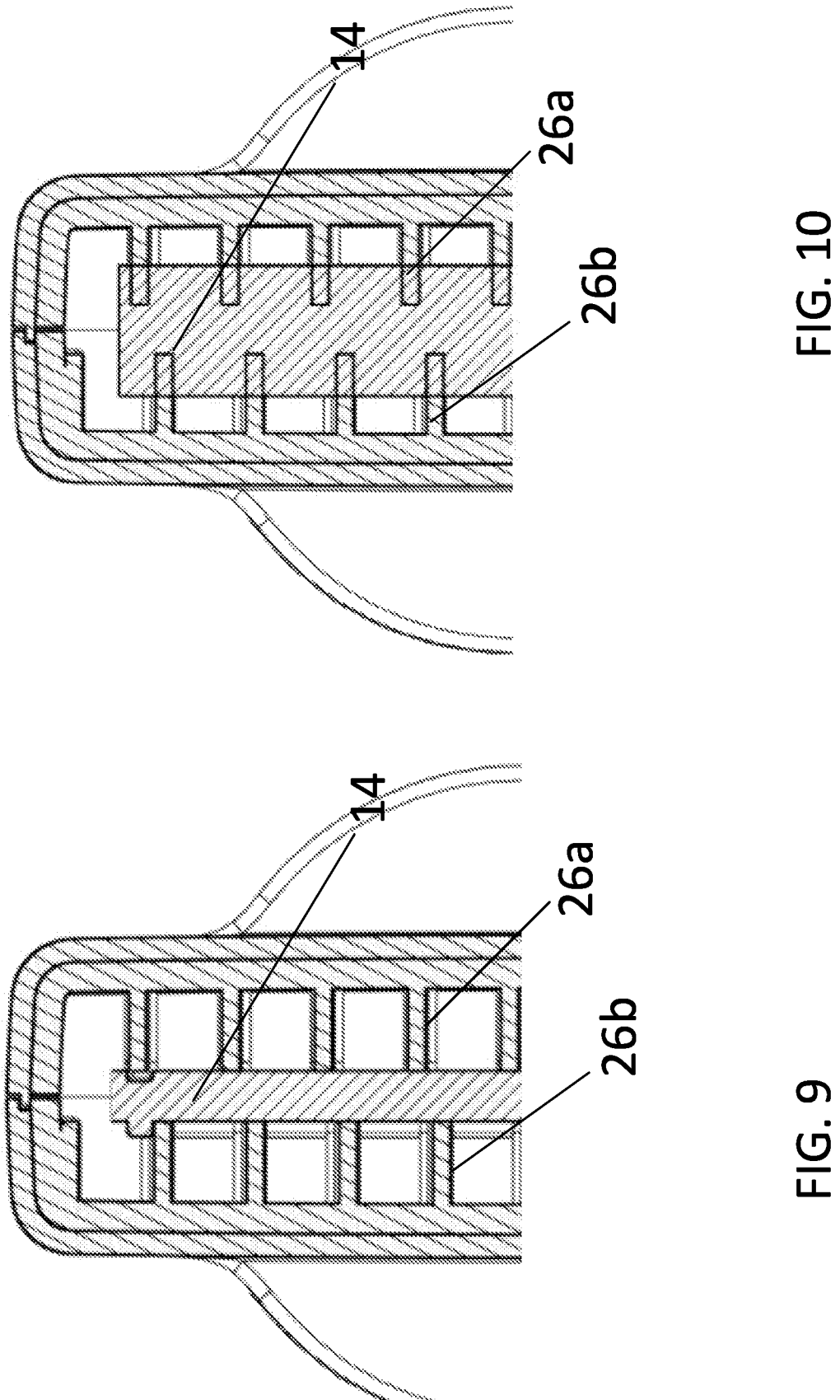
FIG. 9 shows a sectional view of an elastomeric card case holder with a card case, according to an example embodiment.
FIG. 10 shows a sectional view of an elastomeric card case holder with a card case, according to an example embodiment.
Figure 11:
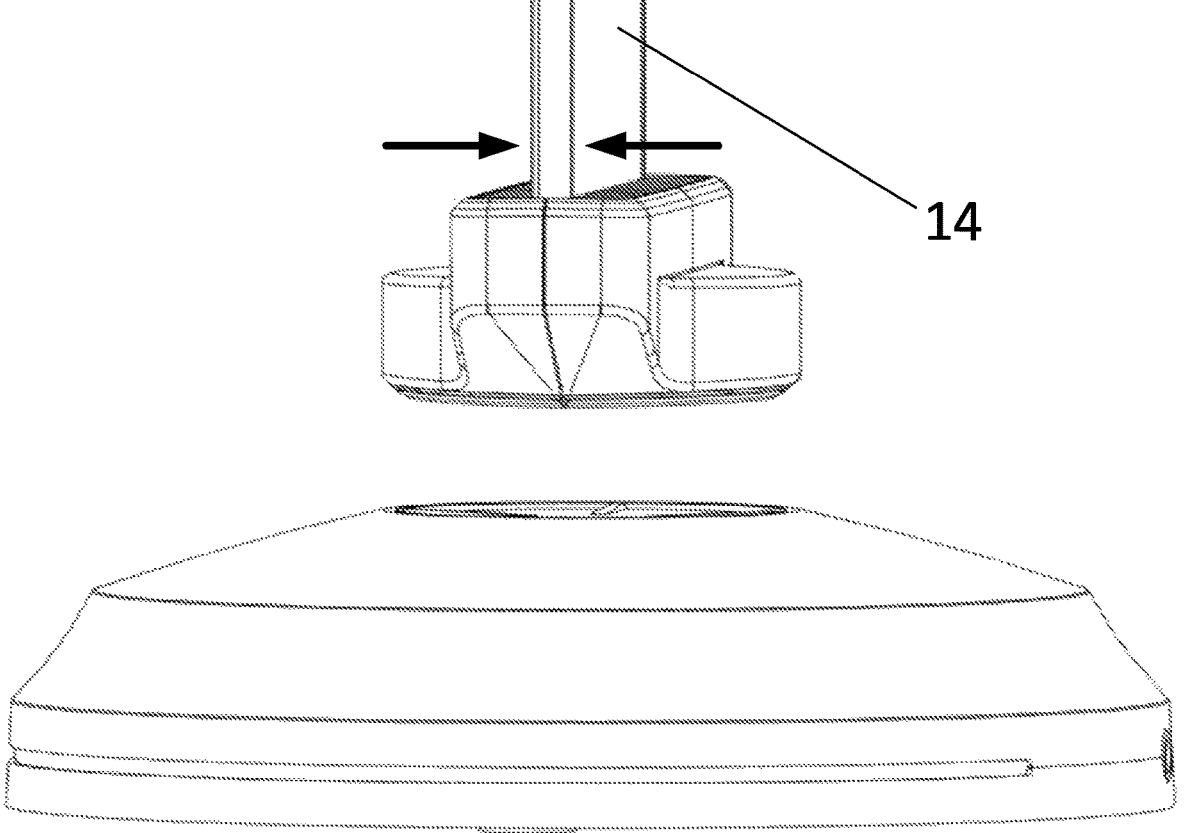
FIG. 11 shows a elastomeric card case holder levitating above an electromagnetic assembly, according to an example embodiment.

As shown in FIG. 7 and FIG. 8, vertical cross-sectional views, represented as line A-A in FIG. 6, of the elastomeric card case holder with a thinner card case and with a wider card case, respectively. Alternatively, as shown in FIG. 9 and FIG. 10, horizontal cross-sectional views, represented as line B-B in FIG. 6, of the elastomeric card case holder with a thinner card case and a wider card case, respectively. As evidenced, the flexible nature of the first plurality of ribs 26a and the second plurality of ribs 26b allow for the slot 13 to hold an encasement 14 regardless of the encasement size. Further, the interference fit provided between the first plurality of ribs 26a and the second plurality of ribs 26b allows for the secured installation of encasements regardless of the thickness of the same and without the use of a mechanical retention solution (e.g. screw system) and/or back support. Furthermore, as illustrated with arrows in FIG. 11, the first plurality of ribs 26a and the second plurality of ribs 26b at each side of the encasement 14 place roughly equal force onto the encasement 14, allowing for the stable and secured installation of the encasement 14 regardless of its width.

Figure 12:
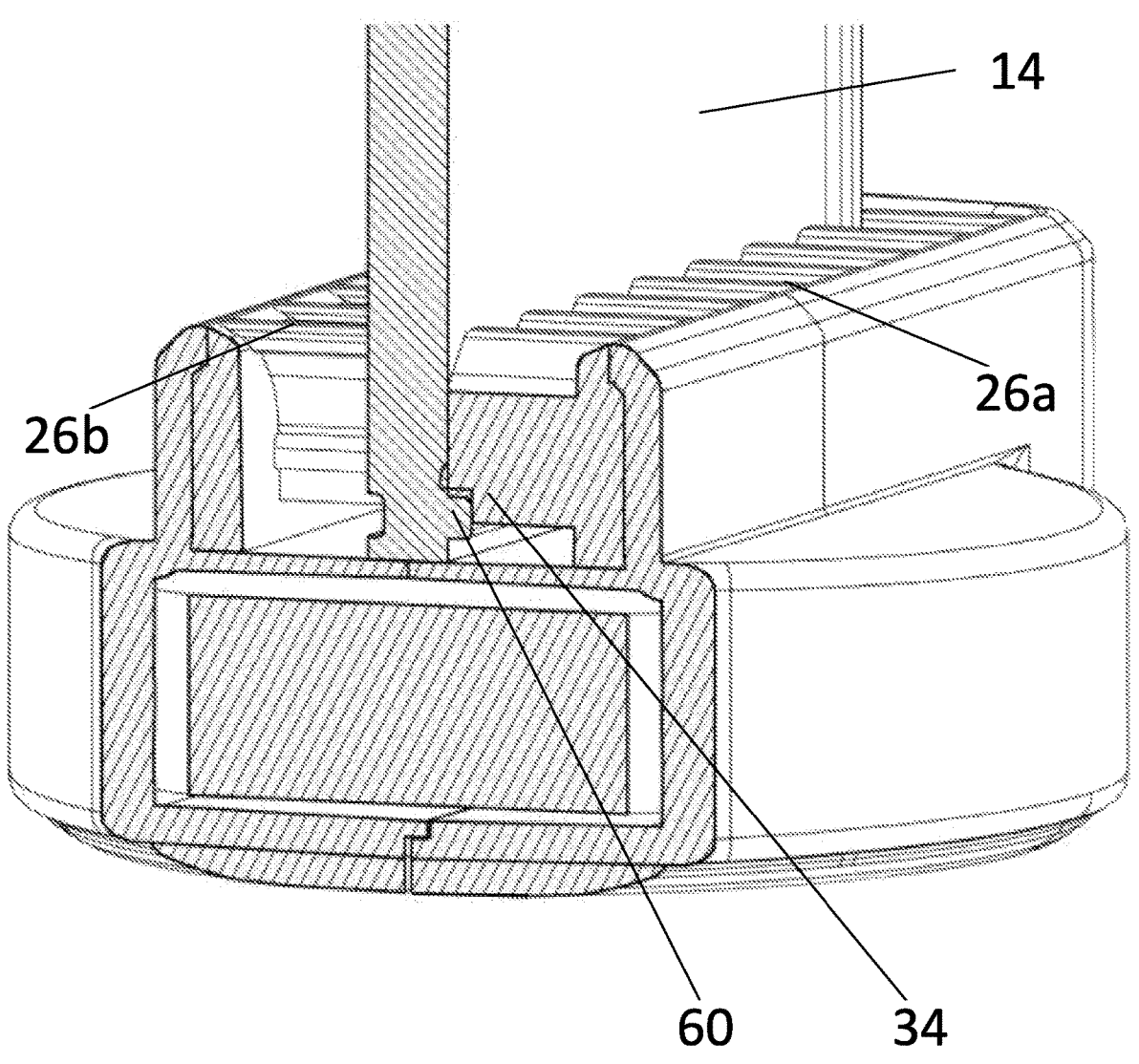
FIG. 12 shows a sectional view of an elastomeric card case holder, according to an example embodiment.

As illustrated in FIG. 12, each rib of the first plurality of ribs 26a and the second plurality of ribs 26b further includes a retention portion 34. Moreover, the encasement 14 is further secured to the system by retention portion 34 of the first plurality of ribs 26a and the second plurality of ribs 26b. This is particularly useful when the encasement 14 is an official card case, which includes a protruding portion 60 that allows for said card cases to be aligned with other cases when these are stored. When the encasement 14 is a card case in being placed in the slot 13 between the first plurality of ribs 26a and the second plurality of ribs 26b, the flexible portion 32 of each rib folds as the encasement 14 is inserted, and allows the encasement 14 to nest in retention portion 34. Then, the retention portion 34 couples with the protruding portion 60 of the encasement 14, further securing the encasement 14 to the system. For example, the retention portion 34 coupled with the protruding portion 60 of the encasement 14 prevents the encasement 14 from being expelled from the levitating elastomeric holder when the holder is inadvertently removed from above the electromagnetic assembly.

Figure 13A:
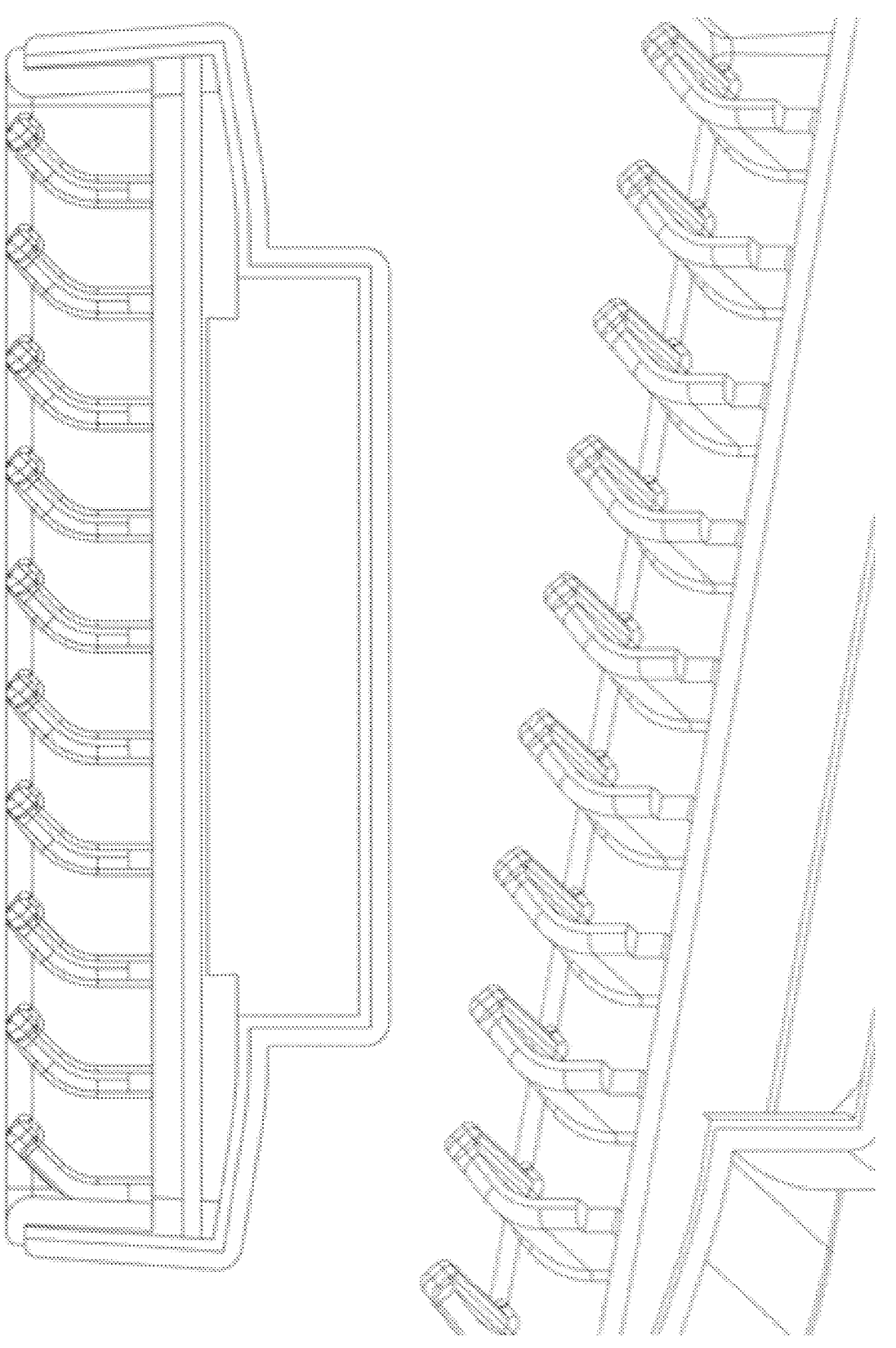
FIG. 13A shows a close-up view of an alternative embodiment of an elastomeric row, according to an example embodiment.
Figure 13B:
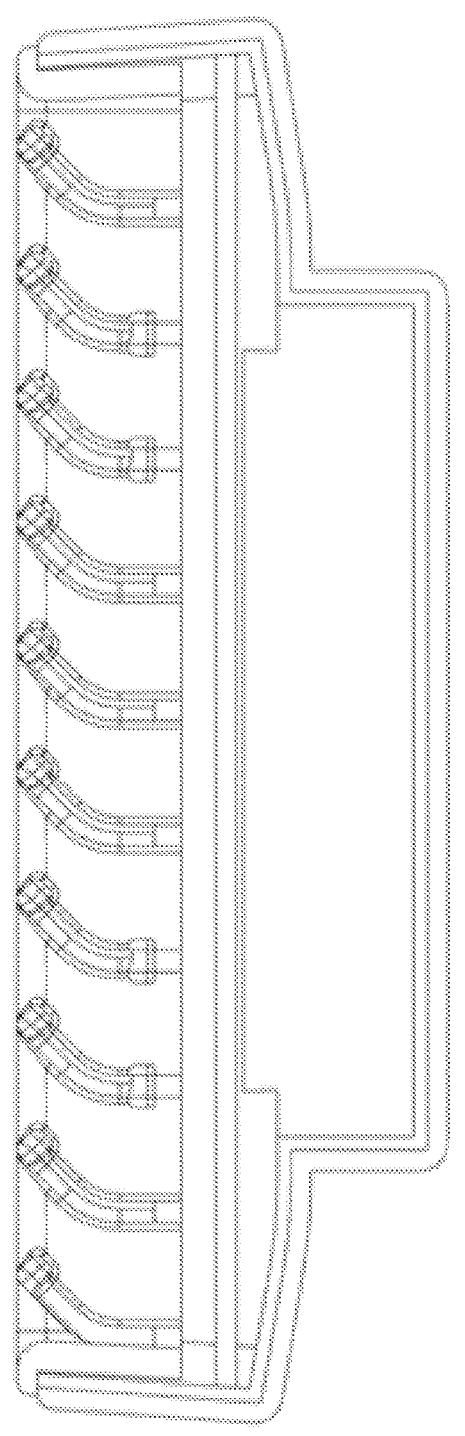
FIG. 13B shows a close-up view of a second alternative embodiment of an elastomeric row, according to an example embodiment.
Figure 13B:
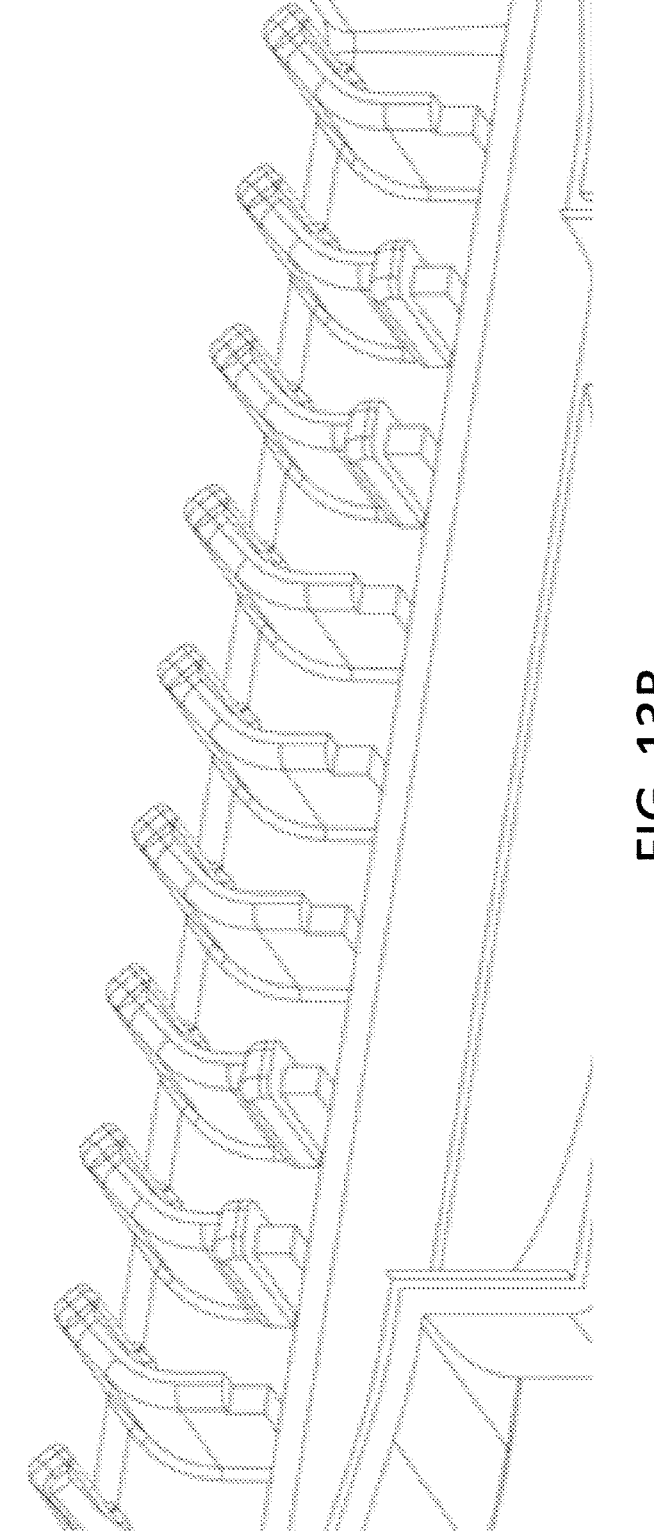
Figure 13C:
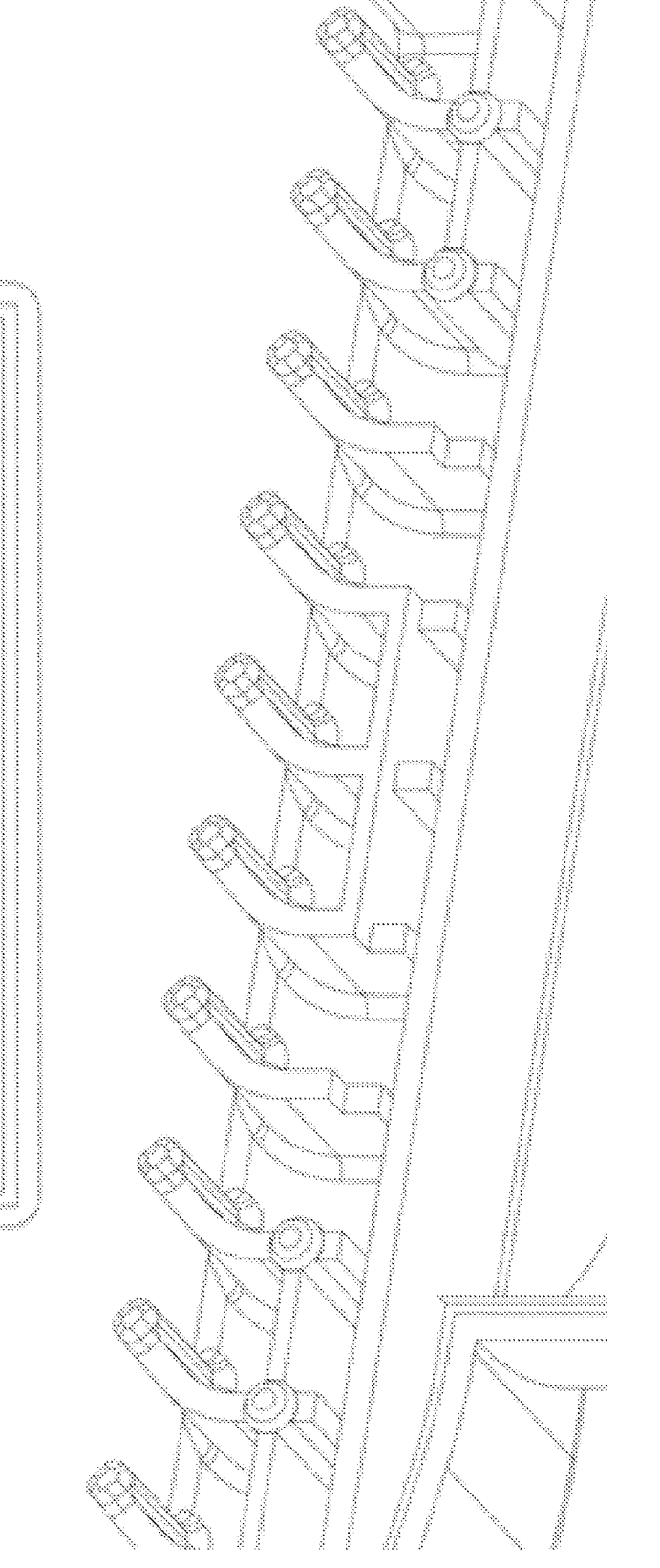
FIG. 13C shows a close-up view of a third alternative embodiment of an elastomeric row, according to an example embodiment.

Furthermore, as illustrated in FIGS. 13A-13C, alternative embodiments to the elastomeric structure shown in FIGS. 5A-5C are possible. For instance, as shown in FIG. 13A, in some embodiments, each rib of the plurality of ribs may have a retention portion comprising a lip and a retaining wall, but no lead-in structure. As shown in FIG. 13B, in some other embodiments, each rib of the plurality of ribs may have a retention portion comprising a lip and a retaining wall, but no lead-in structure, except for a few select ribs in the plurality of ribs that do include the lead-in structure, as shown in FIGS. 5A-5C. Further, as shown in FIG. 13C, in some embodiments, select ribs from the plurality of ribs may be connected by a horizontal portion of material to help further secure an encasement in a slot in a display assembly.

Figure 14:
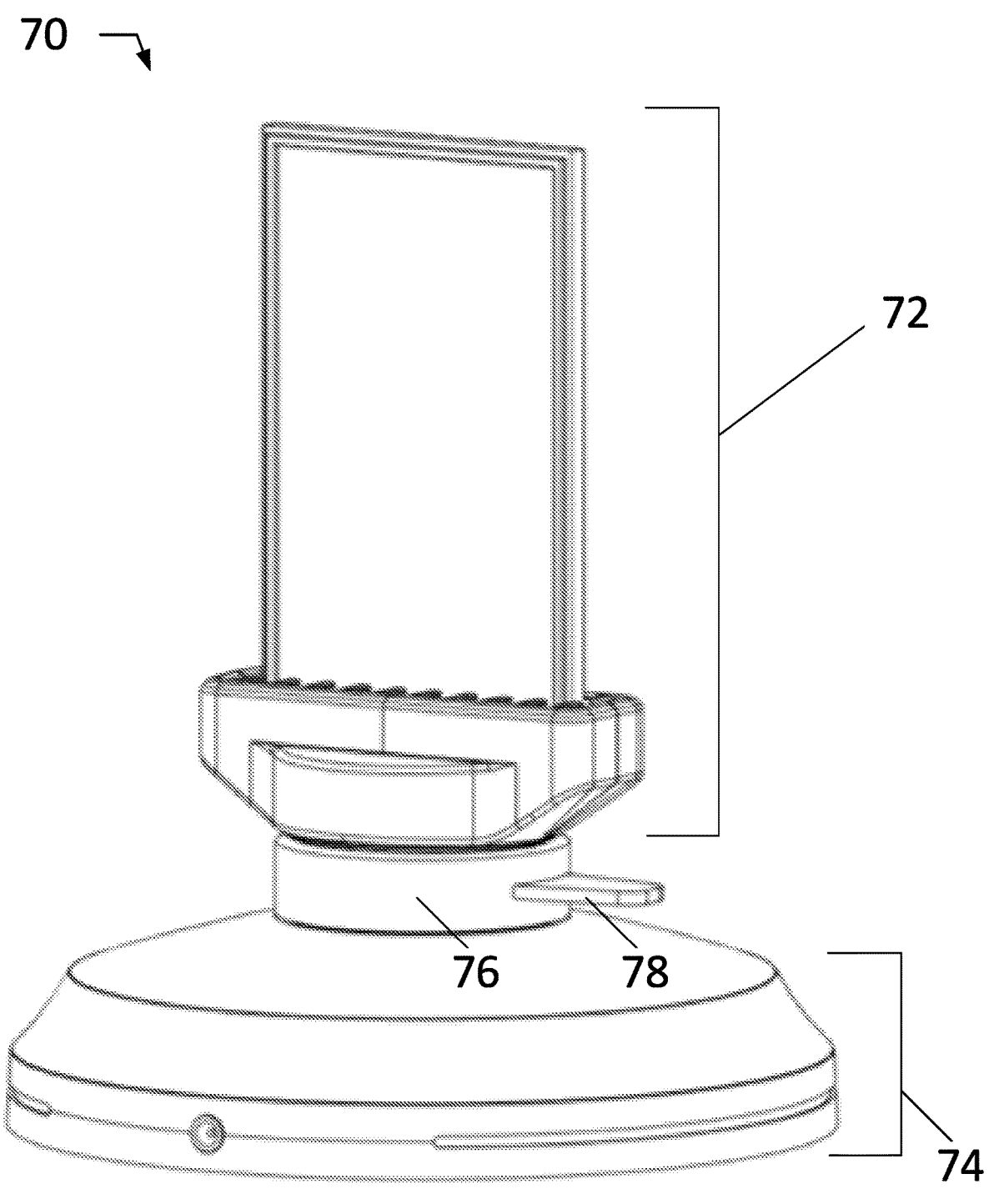
FIG. 14 shows a display assembly being aligned with an electromagnetic assembly by use of an alignment tool, according to an example embodiment.

FIG. 14 shows system 70 having a display assembly 72 and an electromagnetic assembly 74. One skilled in the art will realize that the display assembly 72 may include any components described in FIGS. 1-13C and that the electromagnetic assembly 74 may be of any size, shape, material, or the like to levitate the display assembly 72. In some embodiments, an alignment tool 76, specifically designed to assist users in effortlessly achieving a stable, floating display for their encasements, may aid in aligning the display assembly 72 and the electromagnetic assembly 74 for levitation. The alignment tool 76, in some embodiments, is a slim, cylindrical device equipped with an attached handle 78 for easy removal once the display assembly 72 and the electromagnetic assembly 74 are properly aligned. For instance, in some embodiments, the alignment tool 76 may have a diameter of approximately 65 mm and a height of 22 mm to properly align the display assembly 72 and the electromagnetic assembly 74 for levitation. The alignment tool 76 functions by temporarily occupying the floating void between the display assembly 72 and the electromagnetic assembly 74, ensuring proper positioning and stability for levitation. Once the display assembly 72 is properly aligned with the alignment tool 76 such that the display assembly 72 is securely centered without any magnetic pull from the electromagnetic assembly 74, the alignment tool 76 can be easily removed using the handle 78, allowing the display assembly 72 to continue floating independently above the electromagnetic assembly 74, even in the presence of minor resistance encountered from the removal of the alignment device 76.

III. Example Methods

Figure 15:
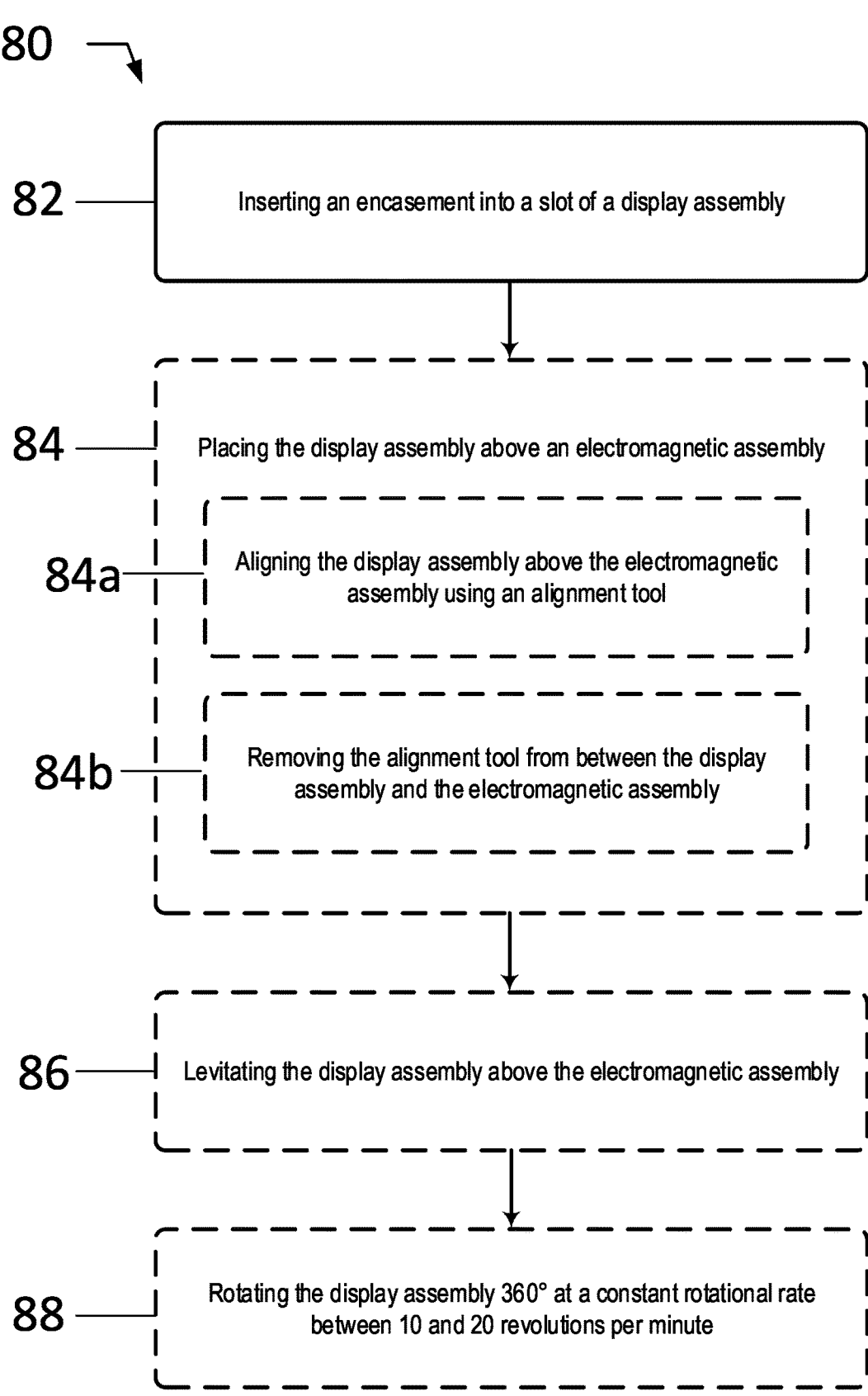
FIG. 15 illustrates a method, according to an example embodiment.

FIG. 15 illustrates a method 80, according to an example embodiment. It will be understood that the method 80 may include fewer or more steps or blocks than those expressly illustrated or otherwise disclosed herein. Furthermore, respective steps or blocks of method 80 may be performed in any order and each step or block may be performed one or more times. In some embodiments, some or all of the blocks or steps of method 80 may relate to elements of the systems described above.

Block 82 includes inserting an encasement into a slot of a display assembly. In some embodiments, the display assembly includes a plastic housing having a lower portion and an upper portion such that the lower portion is configured to house a magnet that is adapted for placement above an electromagnetic assembly for levitation. The upper portion extends at least partially above the lower portion, the upper portion further including the slot configured to receive the encasement. The display assembly also includes an elastomeric structure that is disposed along an interior perimeter of the slot such that the elastomeric structure includes a first plurality of ribs and a second plurality of ribs. Each rib of the first plurality of ribs and each rib of the second plurality of ribs includes a flexible portion and a retention portion such that the flexible portion of each rib of the first plurality of ribs is arranged along a first direction and the flexible portion of each rib of the second plurality of ribs is arranged along a second direction. The flexible portion of the first plurality of ribs and the flexible portion of the second plurality of ribs are configured to receive the encasement and align the encasement in the slot. The retention portion of the first plurality of ribs and the retention portion of the second plurality of ribs are configured to secure the encasement within the slot.

In some embodiments, the method 80 includes block 84, placing the display assembly above an electromagnetic assembly. Further, in some embodiments, placing the display assembly above an electromagnetic assembly includes block 84*a*, aligning the display assembly above the electromagnetic assembly using an alignment tool such that the alignment tool is temporarily placed between the display assembly and the electromagnetic assembly, and block 84*b*, removing the alignment tool from between the display assembly and the electromagnetic assembly.

In some embodiments, the method 80 includes block 86, levitating the display assembly above the electromagnetic assembly.

Further, in some embodiments, the method 80 includes block 88, rotating the display assembly 360° at a constant rotational rate between 10 and 20 revolutions per minute.

Figure 16:
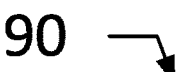
FIG. 16 illustrates a method of manufacture, according to an example embodiment.
Figure 16:
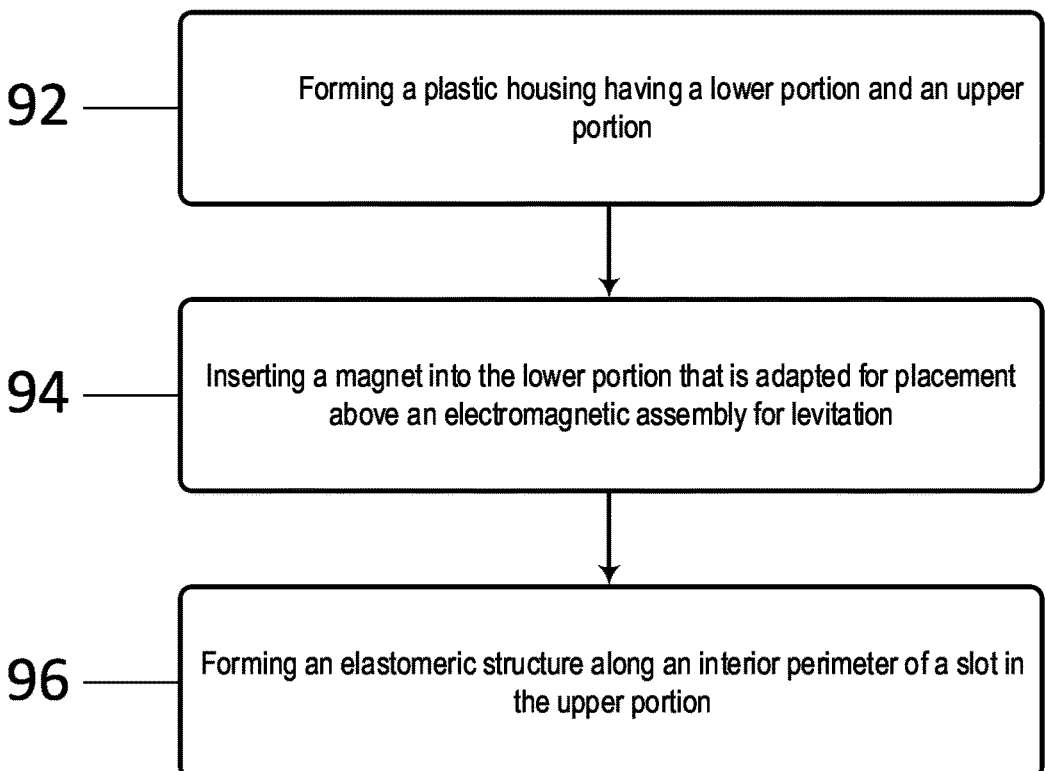

FIG. 16 illustrates a method of manufacture 90, according to an example embodiment. It will be understood that the method of manufacture 90 may include fewer or more steps or blocks than those expressly illustrated or otherwise disclosed herein. Furthermore, respective steps or blocks of method of manufacture 90 may be performed in any order and each step or block may be performed one or more times.

In some embodiments, some or all of the blocks or steps of method of manufacture 90 may relate to elements of the systems described above.

Block 92 includes forming a plastic housing having a lower portion and an upper portion such that the upper portion extends at least partially above the lower portion.

Block 94 includes inserting a magnet into the lower portion that is adapted for placement above an electromagnetic assembly for levitation.

Block 96 includes forming an elastomeric structure along an interior perimeter of a slot in the upper portion. The elastomeric structure includes a first plurality of ribs and a second plurality of ribs. Each rib of the first plurality of ribs and each rib of the second plurality of ribs includes a flexible portion and a retention portion such that the flexible portion of each rib of the first plurality of ribs is arranged along a first direction and the flexible portion of each rib of the second plurality of ribs angles is arranged along a second direction. The flexible portion of the first plurality of ribs and the flexible portion of the second plurality of ribs are configured to receive an encasement and align the encasement in the slot. The retention portion of the first plurality of ribs and the retention portion of the second plurality of ribs are configured to secure the encasement within the slot.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:

a plastic housing having a lower portion and an upper portion, wherein the lower portion is configured to house a magnet that is adapted for placement above an electromagnetic assembly for levitation, and wherein the upper portion extends at least partially above the lower portion, and wherein the upper portion further comprises a slot; and an elastomeric structure disposed along an interior perimeter of the slot, wherein the elastomeric structure comprises a first plurality of ribs and a second plurality of ribs, and wherein:

each rib of the first plurality of ribs and each rib of the second plurality of ribs comprises a flexible portion and a retention portion such that the flexible portion of each rib of the first plurality of ribs is arranged along a first direction and the flexible portion of each rib of the second plurality of ribs is arranged along a second direction, the flexible portion of the first plurality of ribs and the flexible portion of the second plurality of ribs are configured to receive an encasement and align the encasement in the slot, the retention portion of the first plurality of ribs and the retention portion of the second plurality of ribs are configured to secure the encasement within the slot, and the retention portion of each rib of the first plurality of ribs and the retention portion of each rib of the second plurality of ribs further comprises a lip and a retaining wall.

2. The system of claim 1, wherein the first plurality of ribs are along a first half of the elastomeric structure and the second plurality of ribs are along a second half of the elastomeric structure.

3. The system of claim 2, wherein the first half of the elastomeric structure is disposed along a first interior wall of the slot and the second half of the elastomeric structure is disposed along a second interior wall of the slot opposite the first interior wall of the slot.

4. The system of claim 2, wherein the first half of the elastomeric structure further comprises a first horizontal portion attaching together at least two ribs of the first plurality of ribs, and wherein the second half of the elastomeric structure further comprises a second horizontal portion attaching together at least two ribs of the second plurality of ribs.

5. The system of claim 1, wherein the elastomeric structure has a Shore hardness between 30 Shore A and 60 Shore A.

6. The system of claim 1, wherein the elastomeric structure comprises a thermoplastic vulcanizate (TPV), wherein the TPV comprises fully cured ethylene propylene diene monomer (EPDM) rubber particles encapsulated in a polypropylene (PP) matrix.

7. The system of claim 1, wherein the flexible portion of each rib in the first plurality of ribs is arranged between 120° and 150° with respect to a first side of the encasement secured within the slot, and wherein the flexible portion of each rib in the second plurality of ribs is arranged between 120° and 150° with respect to a second side of the encasement secured within the slot.

8. The system of claim 1, wherein a space between the lip and the retaining wall of the retention portion of each rib of the first plurality of ribs comprises a first alignment slot configured to receive a protruding portion of the encasement secured within the slot, and wherein a space between the lip and the retaining wall of the retention portion of each rib of the second plurality of ribs comprises a second alignment slot configured to receive the protruding portion of the encasement secured within the slot.

9. The system of claim 1, wherein each rib of the first plurality of ribs is spaced between 4 mm and 8 mm from an adjacent rib, and wherein each rib of the second plurality of ribs is spaced between 4 mm and 8 mm from an adjacent rib.

10. The system of claim 1, wherein the retention portion of each rib of the first plurality of ribs and the retention portion of each rib of the second plurality of ribs further comprises a lead in structure having a rounded top that is configured to enable the encasement to pass upon insertion of the encasement within the slot.

11. The system of claim 1, wherein the retaining wall of each rib begins at a depth that is closer to a bottom of the slot than a depth of the lip of each rib.

12. The system of claim 1, further comprising:

a bumper pad attached to an underside of the lower portion of the plastic housing, wherein the bumper pad is configured to absorb energy.

\* \* \* \* \*